Aug. 28, 1962  O. W. LIVINGSTON  3,051,880
POSITION CONTROL SERVOSYSTEM
Filed March 23, 1960  2 Sheets—Sheet 1

INVENTOR:
ORRIN W. LIVINGSTON,
BY *Melvin M. Goldenberg*
HIS ATTORNEY.

Aug. 28, 1962   O. W. LIVINGSTON   3,051,880
POSITION CONTROL SERVOSYSTEM
Filed March 23, 1960   2 Sheets-Sheet 2

INVENTOR:
ORRIN W. LIVINGSTON,
BY *Melvin M. Goldenberg*
HIS ATTORNEY.

United States Patent Office 3,051,880
Patented Aug. 28, 1962

3,051,880
POSITION CONTROL SERVOSYSTEM
Orrin W. Livingston, Waynesboro, Va., assignor to General Electric Company, a corporation of New York
Filed Mar. 23, 1960, Ser. No. 17,160
18 Claims. (Cl. 318—28)

The present invention relates to programmed control systems in which program control information is recorded on a suitable recording medium as phase variable signals and more particularly to a programmed control system employing a frequency changing system for converting low frequency, variable-phase control signals to high frequency variable-phase, control signals in which the phase information is faithfully retained.

The apparatus of the present invention is adapted for utilization with programmed control systems of the general type disclosed in the Livingston et al. Patent 2,537,770 wherein control information in the form of a reference signal or signals and one or more variable-phase, information signals are recorded on a data storage such as a magnetic tape. The reference signal or signals are utilized to energize electromagnetic resolvers or selsyns and the phase of the variable phase information signal is compared with the phase of the voltage developed by the rotor of the resolvers or selsyn. The comparison of these signals results in the production of an error signal indicating the difference between the phase of the voltage induced in the rotor and the desired phase of such voltage. Relatively low frequencies of the order of magnitude of 200 cycles per second are utilized for the recorded control signals in the aforesaid patent primarily because these frequencies represent a good compromise between speed of response and accuracy of present tape recorders and reproducers. If the frequency of the recorded signal is increased, the wave length of the recorded signals becomes very small so that slight misalignment of the head or skew of the tape produces relatively large phase errors. On the other hand, if the frequency is made lower than that referred to above, the rate at which the control information may be produced, that is, the sampling rate is decreased and the frequency response or rate of response of the system which determines its ability to accurately follow a dynamic program, is seriously impaired.

Although there are many advantages to be obtained in consequence of recording the control information at relatively low frequencies of the order of magnitude of 200 cycles per second, these frequencies introduce certain serious problems in the resolver section of the apparatus. Specifically, the resolvers or selsyns which must be employed at frequencies of the order of magnitude of 200 cycles per second contain large amounts of wire and large quantities of iron. Further, electromagnetic resolvers operating at such low frequencies must be manufactured to extremely close tolerances thereby greatly increasing the cost of such systems. On the other hand, resolvers adapted to operate at relatively high frequencies, of the order of magnitude of 10 kc. per second, can be readily fabricated with relatively little copper and no iron and yet produce satisfactory signal levels as the result of the high rate of change of flux. Further, the high frequency resolvers are small and are easily manufactured to the required tolerances.

It is, therefore, an object of the present invention to provide a programmed control system utilizing relatively low frequency variable-phase control signals and relatively high frequency signals in the resolver section of the apparatus.

It is another object of the present invention to provide a frequency conversion apparatus for converting recorded low frequency signals containing information in the form of the relative phases of two or more low frequency signals to two or more high frequency signals having relative phases and/or magnitudes which determine the motion of an element in accordance with the phase of the low frequency signals.

In accordance with the present invention, two or more low frequency signals are recorded on a suitable record medium, such as a magnetic tape, with one of the signals constituting a fixed phase reference signal and each of the other signals constituting a variable-phase motion control signal. The reference and each of the motion signals are fed to separate phase discriminators to produce a first direct current voltage having a magnitude and polarity determined by the angle and sense of the angle between the reference signal and the motion signals. There is provided another phase discriminator for each motion for producing a direct signal having a polarity and magnitude determined by sense and the phase between the recorded information or motion control signal and the recorded reference signal that is shifted in phase by 90°. The magnitudes of the D.C. voltages produced by the two discriminators represent the cosine and the sine functions, respectively, of the phase of the variable phase motion signal with respect to the fixed phase reference signal, while the polarities of these voltages are determined by the proper algebraic sense of the sine or cosine function of the angle. The two direct current signals produced by the phase discriminators are thereafter utilized to control the magnitude of two high frequency signals. Each of the high frequency signals has a magnitude and phase sense determined by the magnitude and polarity of a different one of the direct current signals. Means are provided for combining the high frequency signals either in the resolver or in one of the inputs to a discriminator to provide a D.C. voltage output which is then used to control motor means to position a movable element in the resolver so that it is continuously maintained in substantial positional agreement with the input information originally expressed as the phase angle between the low frequency motion and reference signals.

The above and still further objects, features and advantages of the present invention will become apparent upon consideration of the following detailed description of one specific embodiment thereof, especially when taken in conjunction with the accompanying drawings, wherein.

Figure 1:
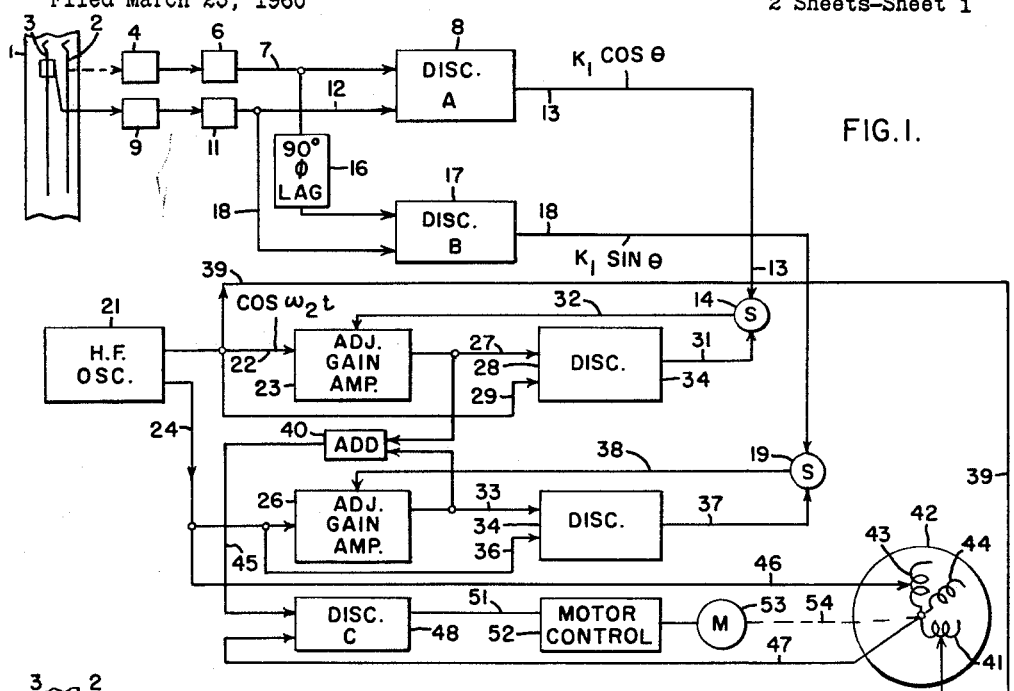
FIGURE 1 is a schematic block diagram of the first embodiment of the present invention.

Referring specifically to FIGURE 1 of the accompanying drawings, there is provided a record medium 1 which for the purposes of explanation is assumed to be a magnetic tape having recorded thereon two longitudinally extending tracks 2 and 3 containing signals having relative phases with respect to one another indicative of the instantaneous position of a machine to be controlled. The track 2 is assumed to have recorded therein a constant frequency variable signal having a fixed phase with respect to time hereinafter referred to as the reference signal, while the track 3 has recorded therein a signal of approximately the same frequency as the frequency of the signal recorded in the channel 2 having a constant amplitude and an instantaneous phase relationship with respect to the phase of the reference signal indicative of the desired instantaneous position of a controlled element.

The information in track 2 is adapted to be sensed by a magnetic pick-up head or element 4 which converts the electromagnetic patterns recorded along the channel 2 into electrical signals which are amplified in a preamplifier 6 and applied via a lead 7 to one input circuit of a conventional phase discriminator 8. The signals recorded in track 3 of the tape 1 are converted to voltage signals by an electromagnetic transducer 9 and these voltages are applied via a preamplifier 11 and a lead 12 to a second input circuit of the conventional phase discriminator 8. The phase discriminator 8 produces a direct voltage on a lead 13 indicative of the cosine of the phase angle subsisting between the two input signals applied to the discriminator and, therefore, has a magnitude and polarity determined by the relative phase of the signals along tracks 2 and 3. The voltage on lead 13 is applied to an algebraic summation circuit 14 for purposes which become apparent subsequently.

The reference voltage appearing on the lead 7 is coupled through a phase shift circuit 16 which retards the phase of the voltage by 90°, to an input circuit of a second conventional phase discriminator 17 while the variable phase voltage appearing on the lead 12 is directly coupled via a lead 18 to a second input circuit of the discriminator 17. Obviously the 90° displacement may be in either line. Since the reference voltage on lead 7 has its phase retarded by 90°, the discriminator 17 develops a direct voltage on its output lead 18 that is proportional to the sine of the angle between the voltages appearing on the leads 7 and 12. The voltage on lead 18 is applied to a second algebraic summation circuit 19. Thus, the signals on the output leads 13 and 18 of the discriminators 8 and 17, respectively, have amplitudes indicative of the in-phase and quadrature-phase components of the information signal relative to the reference phase signal recorded in the channel 2 of the tape 1. Stated otherwise, the direct current signals on the leads 13 and 18 have amplitudes indicative of the projection of a vector representing the phase difference of the two input signals on the X and Y axis of a Cartesian coordinate system.

In order to generate the high frequency voltage required in the present system, there is provided a high frequency oscillator 21 having a first, fixed-phase signal coupled via an oscillator output lead 22 to a first adjustable gain, reversible phase amplifier 23. The oscillator 21 is provided in this embodiment of the invention with a second output lead 24 which is connected to a second adjustable gain reversible phase amplifier 26, the voltages on the leads 22 and 24 being in phase-quadrature.

The output voltage of the adjustable gain amplifier 23 is coupled via a lead 27 to one input circuit of a discriminator 28 having a second input circuit coupled via a lead 29 to the lead 22. The amplitude discriminator 28 produces a direct voltage on its output lead 31 that is coupled to the summation circuit 14. The voltages developed on the leads 13 and 31 are algebraically summed by means of the summation device 14 to produce a direct voltage on a lead 32 having a magnitude and polarity determined by the relative amplitudes and polarities of the voltages on the leads 13 and 31. Specifically, the voltages on the leads 13 and 31 are subtracted from one another in order to produce a voltage on the lead 32 equal to the difference between these two voltages. The voltage on the lead 32 is applied to the amplifier 23 to control the amplitude and the sense of the alternating current signal on lead 27 such that the signal on lead 32 is reduced substantially to zero.

The circuit, including the adjustable gain amplifier 23, the discriminator 28 and the summation device 14 is employed to produce on the output lead 27, an alternating voltage having an amplitude proportional to the amplitude of the direct voltage on the lead 13 and a phase, either in-phase or 180° out-of-phase with the signal on lead 22, determined by the polarity of the voltage on lead 13. In order to accomplish this result, the voltages on the leads 27 and 22 are compared to produce a direct voltage on the lead 31 having a magnitude and polarity determined by the magnitudes and phases respectively of the voltage on leads 22 and 27. This voltage is compared with the voltage on lead 13 to produce a voltage on lead 32 equal to the difference between the two voltages. The voltage on the lead 32 is employed to adjust the gain of the variable gain amplifier 23 to vary the magnitude and sense of the voltage on lead 27 until this voltage has a sense and magnitude determined by the polarity and magnitude on lead 13, at which time the voltage on the lead 32 is reduced substantially to zero since the adjustable gain sensitivity of amplifier 23 is high. In consequence of this arrangement, there is produced on the lead 27 an alternating voltage having a magnitude and sense indicative of the cosine of the angle between the signals recorded in the channels 2 and 3 of the tape 1, but having a frequency which is considerably higher than the frequency of these signals.

A circuit arrangement is also provided for developing an alternating voltage in phase quadrature with that on lead 27 and having an amplitude directly proportional to the amplitude of the D.C. voltage on the lead 18. Specifically, the output voltage developed by the adjustable gain amplifier 26 is applied via a lead 33 to a first input circuit of a discriminator 34 having a second input circuit coupled via a lead 36 to the lead 24. The discriminator 34 develops a D.C. signal on its output lead 37 having a magnitude and polarity determined by the relative magnitudes and polarities of the signals appearing on the leads 33 and 36. The signals on the lead 37 are algebraically added to the D.C. signal appearing on the lead 18 by means of the summation device 19 to produce on a lead 38, a D.C. voltage indicative of the relative magnitudes and polarities of the voltages on leads 18 and 37. The voltage on the lead 38 is applied to a gain control circuit of the adjustable gain amplifier 26, to vary the gain of this circuit until the error voltage on the lead 38 is reduced substantially to zero. At this time, the alternating voltage on the lead 33 has a magnitude and sense which is directly proportional to the magnitude and polarity of the sine function of the angle subsisting between the signals recorded in the channels 2 and 3 of the tape 1 and a phase determined by the lead or lag of the information signal with respect to the reference signal. Therefore, the signals on the leads 27 and 33 are identical in magnitude and phase with the vectorial components of the information signal and may be combined to reconstitute the information signal so far as the phase information is concerned but at the frequency of the oscillator 21 rather than that of the original signal produced on lead 12. The vector summation of the voltages on leads 27 and 33 is effected by an addition circuit 40 which develops on its output lead 45 a voltage having a phase relative to the phase on the lead 22 which conforms precisely to the phase of the information signal relative to the reference signal. The information recorded on the tape 1 is intended, in the specific embodiment of the invention, to represent the instantaneous position of a load and the signals reproduced on the tape are intended to be employed to effect proper positioning of the load. In order to perform such a function, the position of the load must be sensed and a signal developed indicative of this position. In accordance with the present invention, the latter functions are performed by a two-phase electromagnetic resolver 42 having a rotor which may be directly mechanically connected to the load or as in the system illustrated may be connected to the motor for driving the load.

The voltage appearing on the line 22 is coupled via a lead 39 to a first field winding 41 of the resolver 42 having a second field winding 43 arranged electromagnetically in quadrature with the winding 41 and having a rotor winding 44 which is rotatable with the rotor within the magnetic field produced by the summation of the magnetic fields generated by the individual field windings 41 and 43. The voltage appearing on the lead 24, which is equal in magnitude but 90° phase displaced from the voltage appearing on line 22, is coupled via a lead 46 to the field winding 43 of the resolver 42 so that there is now established within the resolver 42 a uniform rotating electromagnetic field having a direction of rotation and a phase relative to the initiating voltages. The voltage developed in the rotor winding 44 of the resolver 42 has a phase indicative of the position of the rotor winding 44 in the magnetic field and consequentially indicative of the mechanical angular position. The voltage is coupled via a lead 47 to one input circuit of a phase discriminator 48 having a second input circuit coupled to receive the voltage developed on the lead 45. The voltage on the lead 45 has an instantaneous phase relative to the voltage on the lead 22 which is identical with the phase of the information signal in the channel 3 with respect to the phase of the reference signal recorded in the channel 2 and the voltage in the rotor winding 44 has a phase indicative of the position of the rotor relative to the field windings. Therefore, the direct voltage appearing on output lead 51 of the discriminator 48 has a magnitude and polarity determined by the actual position of the rotor relative to its desired position.

The operation of the circuit may be considered wholly on the basis of vector components. As previously indicated, the signal recorded in the channel 3 has an instantaneous angle with respect to the reference signal 2 indicative of a desired position of an element to be controlled. By means of the discriminators 8 and 17 and the phase shift circuit 16, two D.C. voltages are developed which are indicative of the motion signal angle along the two axes of a Cartesian system, that is, along two axes which intersect at right angles. The voltages on the leads 22 and 24 are in phase quadrature or electrically disposed at 90° with respect to one another, as are the aforementioned quadrature voltages; and upon adjustment of their amplitudes to correspond to the amplitudes of the quadrature voltages derived by the discriminators 8 and 17, the voltages on the leads 27 and 33 when summed, produce a signal having a phase angle with respect to the voltage on the lead 22, which is identical with the phase angle between the signal in the channel 3 with respect to the channel 2. The resolver 42 is a position transducer, producing a voltage having the proper phase in the rotor winding 44 only when the rotor assumes a position with respect to the field winding 41 which is angularly the same as the angle between the signals recorded in the channels 2 and 3. If the rotor 44 is in any other position, the voltage induced in the winding 44 will be of a different phase since different proportions of the two quadratures phase voltages will be added therein. Only when the rotor 44 is in the proper position to have proper proportions of the voltages applied to the windings 41 and 43 is the proper phase signal generated in this winding. Since the voltage on the lead 45 has the desired phase and the voltage on the lead 47 has a phase indicative of the actual position of the rotor 44, the output voltage developed by the discriminator 48 on its output lead 51 is an error signal determined by the difference between the desired phase of the voltage which appears on the lead 45 and the actual phase of the voltage which appears on the lead 47. Therefore, the error signal on the lead 51 may be employed via a motor control circuit 52 to control the position of a motor 53 which is physically coupled via a mechanical coupling 54 to drive or position the rotor 44 or a member to which it is coupled. When the rotor 44 is in the correct position, the relative phases of the voltages on the leads 47 and 45 are such that the voltage on the lead 51 is zero, that is, the voltages on the leads 47 and 45 are displaced 90° with respect to one another. If the rotor 44 is not in a correct position, the voltage in the rotor 44 will have a phase which differs from the phase of the voltage on the lead 45 by other than 90° and an error signal appears on the lead 51 having a polarity determined by whether the voltage on lead 47 lags or leads the voltage on the lead 45 and an amplitude determined by the angle of the angular difference between the actual position of the rotor 44 and its desired position. The invention has been disclosed in conjunction with a quadrature wound resolver, however, if desired by the use of transformer connected in the well-known Scott-T, a three phase selsyn could be used.

In the system illustrated in FIGURE 1 of the accompanying drawings, the original signals 2 and 3 of the low frequency system were reconstituted in the high frequency system since the voltage on the lead 22 constituted a reference phase voltage while the voltage on the lead 45 constituted the instantaneously varying information signal. It is not intended to limit the apparatus of the present invention to a system in which the original signals are reconstituted and upon reference to the embodiment of the invention illustrated in FIGURE 2 it is shown that it is only necessary to provide two high frequency signals of the same phase having amplitudes determined by the amplitudes of the voltages on the leads 13 and 18 in order to provide the desired control system.

Figure 2:
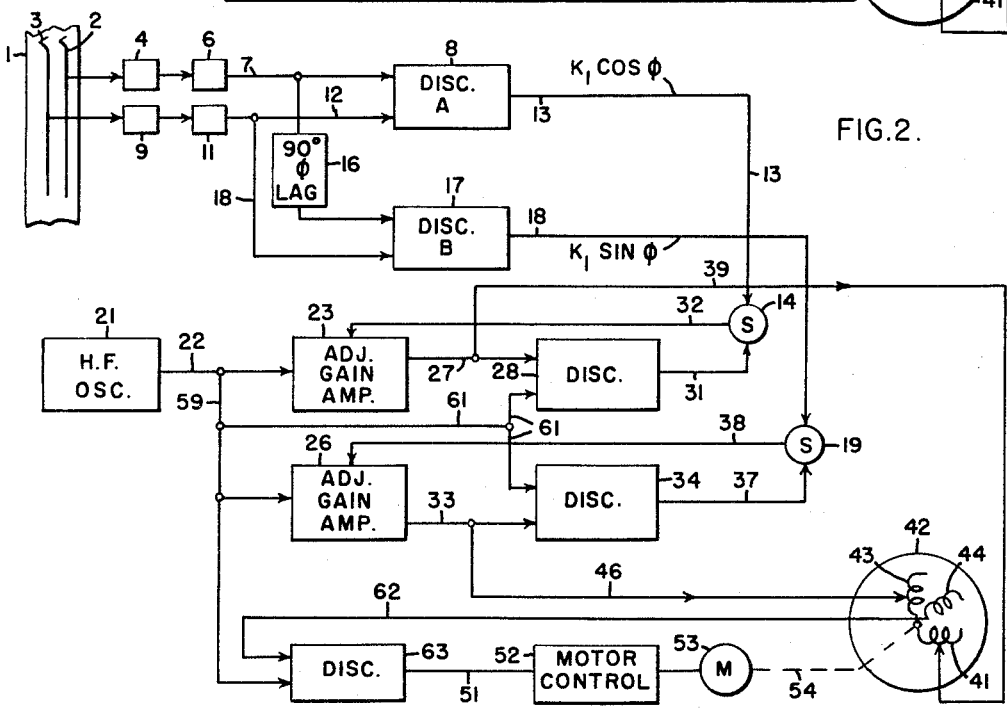
FIGURE 2 is a schematic block diagram of a second embodiment of the present invention.

Referring now specifically to FIGURE 2 of the accompanying drawings wherein those elements which appear in both figures carry the same reference numerals as in FIGURE 1, the phase reference signal and the information signal are recorded in channels 2 and 3 of the tape 1. The signals recorded in the channel 2 are converted to a voltage by the transducer 4, amplified by preamplifier 6, and applied via the lead 7 to the discriminator 8. The information signals recorded in the channel 3 of the tape 1 are converted to voltage signals by the transducer 9, amplified by the preamplifier 11 and coupled via the lead 12 to the discriminator 8. The signals on the lead 12 are also coupled via the lead 18 to the discriminator 17 and the signals on the lead 7 are coupled via the 90° lag circuit 16 to the discriminator 17. The voltages appearing on the leads 13 and 18 are applied respectively to summation devices 14 and 19. The output lead 32 of the summation device 14 is adapted to control the gain of the adjustable gain amplifier 23 while the output voltage of the summation device appearing on the lead 38 is adapted to control the gain of the adjustable gain amplifier 26. The voltage developed by the adjustable gain amplifier 23 on its output lead 27 is applied to the discriminator 28 which develops a D.C. voltage on its output lead 31 which is applied to the summation device 14. Similarly, the adjustable gain amplifier 26 develops an output voltage on its output lead 33 which is coupled to the discriminator 34. The discriminator 34 develops a direct voltage on its output lead 37 which is applied to the summation device 19. Further, the voltage on the lead 27 is coupled via the lead 39 to a field winding 41 of the resolver 42. The voltage on the output lead 33 from the adjustable gain amplifier 26 is coupled via a lead 46 to the field winding 43 of the resolver 42.

In this embodiment of the present invention, the high frequency oscillator 21 provides a single output voltage on the lead 22 which supplies the voltage to the input of the adjustable gain amplifier 23 and via the lead 59 to the input circuit of the adjustable gain amplifier 26. The second input to each of the discriminators 28 and 34 is supplied from the lead 22 via leads 59 and 61. The output voltage developed on the rotor winding 44 of the resolver 42 is coupled via a lead 62 to a discriminator 63 and thence to the motor control circuit 52 which controls the direction and speed of rotation of an electric motor 53. The motor 53 is connected by mechanical coupling 54 to the rotor 44 of the resolver 42. A second input signal for the discriminator 63 is obtained from the oscillator 21 by leads 22 and 59.

In this embodiment of the invention the gain of the adjustable gain amplifiers 23 and 26 is adjusted so that the voltages developed on the leads 31 and 37 are equal in magnitude to the voltages developed on the leads 13 and 18, respectively. However, in this embodiment of the invention, since voltages of the same phase are applied to the amplifiers 23 and 26, the voltages of the leads 27 and 33 have the same phase. In consequence, the two voltages applied to the windings 41 and 43 are in phase and an electromagnetic field is developed in the resolver 42 that is stationary in space and has a position and sense determined by the relative magnitudes and sense of the voltages applied to the field windings. Considering for a moment the circuit utilized in FIGURE 1, since the voltages applied to the windings 41 and 43 are equal and 90° out-of-phase with respect to one another, the electromagnetic field in which the rotor 44 is disposed is uniformly rotating and, therefore, so long as the rotor is not rotating at the same speed as the magnetic field, an A.C. voltage is induced therein. However, in the embodiment of FIGURE 2 since the voltages applied to the windings 41 and 43 are in phase, the magnetic field is stationary so far as direction is concerned, and the rotor may assume a position at which time the voltage induced therein is zero.

The angle between the rotor 44 and the winding 41 at which no voltage is induced in the rotor 44, is a function of the phase angle between the signals recorded in the channels 2 and 3 of the tape 1. The reason for this can be seen by initially considering the fact that the windings 41 and 43 each set up mutually perpendicular magnetic fields each having a magnitude determined by the magnitude of the voltages appearing on one of the leads 13 and 18. Since the magnetic fields are disposed at 90° with respect to one another, they constitute the in-phase and quadrature vectors and since the magnitudes are of the proper value, the resultant vector or magnetic field assumes the phase of the signal 3 with respect to the rotor winding 41. Therefore, when the rotor 44 assumes a position with the axis of its winding perpendicular to this field, it has assumed a position relative to the winding 41 corresponding to the angle between the signals in tracks 2 and 3. When the rotor winding axis is not perpendicular with the magnetic field, a voltage appears on the lead 62 having a magnitude indicative of its deviation from its proper position, and having one-phase or an opposite phase determined by its direction of rotation relative to its proper position. The signal on the input lead 62 of the discriminator 63 in cooperation with the second signal on line 59 produces a D.C. output on the line 51 which is proportional to the amplitude of the input signal on 62 and has a polarity determined by the phase sense of this signal. Thus, as in FIGURE 1, this error signal on line 51 may be employed via a motor control circuit 52 to control the position of a motor 53 which is physically coupled via a mechanical coupling 54 to drive or position the rotor 44 or a member to which it is coupled.

The operation of the various elements, illustrated as blocks in FIGURES 1 and 2, is well-known in the art but for the sake of completeness, the circuits included within the blocks designating the adjustable gain amplifiers 23 or 26, the discriminators 28 or 34 and the summation circuits 14 or 19 are described with reference being made to FIGURE 3 of the accompanying drawing which illustrates these elements and their interconnection. The input leads 22, which in the detailed circuit diagram are illustrated as a pair of leads rather than as a single lead as in FIGURES 1 and 2, are connected across a primary winding 66 of a transformer 67 having a pair of secondary windings 68 and 69. One end of the winding 68 is connected to a grid 71 of a triode 72 having an anode 73 and a cathode 74. The other end of the secondary winding 68 is coupled to a negative voltage bus 76 through a resistor 77. The triode 72 has an anode load resistor 78 returned to a positive voltage bus 79 and is capacitively coupled to a grid 81 of a triode 82. The secondary winding 69 of the transformer 67 has one end connected to a grid 83 of a triode 84 having an anode 86 and a cathode 87. The other end of the winding 69 is returned to the negative voltage bus 76 through a resistor 87. The anode 86 of the triode 84 is returned to the positive voltage bus 79 through the load resistor 78 which it shares in common with the anode 73 of the triode 72. A cathode 87 of the triode 84 is returned to a point of reference potential such as ground as is the cathode 74 to the triode 72.

A primary winding 88 of a transformer 89 having a secondary winding 91, has one end connected to an anode 92 of the triode 82 and its other end connected to an anode 93 of a triode 94 having a grid 96 and a cathode 97. The primary winding 88 of the transformer 89 is center tapped and the center tap is connected to the positive bus voltage 79. The secondary winding 91 of the transformer 89 couples the output voltage of the variable gain amplifier to the output leads 39. The cathodes of the triodes 82 and 94 are connected together and are returned via a resistor 97 to the negative voltage bus 76.

The tubes 72 and 84 which may conveniently be of the variable gain or remote cut-off type are operated essentially Class A and constitute a differential amplifier which depending upon the relative biases on the grids 71 and 83 produces an alternating voltage at the grid 81 of the tube 82 of an amplitude depending upon the relative amplitudes of the currents flowing through the tubes 72 and 84 and having a phase depending upon which of the tubes is conducting the more heavily. If the biases on the two tubes are identical, then since the signals applied to the grids 71 and 83 are 180° out-of-phase, no signal is applied to the grid 81. However, when the biases of the two tubes are different, the signal generated by one of the tubes 72 and 84 predominates over the signal generated by the other and a signal is applied to the grid 81 having the phase of the output voltage of the tube having the lower negative grid bias and of a magnitude determined by the magnitude of the differences between the grid biases on the tubes 72 and 84. The tubes 82 and 94 constitute a push-pull amplifier since signals applied to grid 81 of tube 82 are partially reproduced across the resistor 97 and have an effect upon the conduction of tube 94 that is the reverse of the effect upon tube 82 of the signal on its grid. Both grids 81 and 96 of tubes 82 and 94, respectively, are returned to ground so that in the absence of a signal across resistor 78, steady state conduction is assumed by both tubes and no signal can be induced in the secondary winding 91 of transformer 89.

The relative biases on the tubes 72 and 84 are controlled by a pair of triodes 98 and 99. The tube 98 is provided with a cathode 101, a grid 102 and an anode 103 returned to the high bus voltage 79 via an anode load resistor 104. The anode 103 is also connected via a lead 106 and a resistor 107 to the end of the resistor 77 connected to one end of the secondary winding 68 and transformer 67. The triode 99 is provided with a cathode 108 connected to the cathode 101 of the triode 98, and via a resistor 109 to the negative voltage bus 76. The triode 99 is provided with a grid 111, which is returned to ground through a resistor 112 and an anode 113 which is returned to the positive voltage bus 79 via an anode load resistor 114. The anode 113 of the triode 99 is also connected via a lead 116 and resistor 117 to the end of the resistor 87 connected to one end of the secondary winding 69 of the transformer 67. The grid 102 of the triode 98 is connected via the lead 32 to the output voltage from the summation device 14, and therefore, the magnitude and polarity of the signal on the grid 102 depends upon the relative magnitude and polarity of the signals applied to the device 14 via leads 13 and 31. In consequence, the signal on the grid 102 may be at ground potential or may be positive or negative with respect to ground potential. In the former case, the tubes 98 and 99 conduct to the same extent and the bias voltages applied to the grids 71 and 83 of the tubes 72 and 84 are equal. In the latter case, when a signal is developed on lead 32, the conduction of tube 98 is altered and because of the common cathode resistor 109, the conduction of the tube 99 is altered in the opposite sense. Therefore, upon a signal appearing on lead 32, the biases on the grids 71 and 83 of the triodes 72 and 84 are varied in opposite senses and one or the other of the tubes is rendered more conductive than the other depending upon the polarity of the signal on the grid 102. The summation device 14 constitutes two resistors 118 and 119 having one end of each connected together and to the lead 32 with the other end of the resistor 118 connected to the lead 13 and the other end of the resistor 119 connected to the lead 31.

The discriminator 28 comprises four vacuum tubes 121, 122, 123 and 124. The cathodes of all of these tubes are connected together while the grids of the tubes 121 and 122 are connected together through grid resistors and the grids of the tubes 123 and 124 are connected together through grid resistors. An anode 135 of the triode 121 is connected via a further secondary winding 136 of the transformer 89 to anode 137 of the triode 123 while anode 138 of the triode 122 is connected via a still further secondary winding 139 of the transformer 89 to an anode 141 of the triode 124. For the purpose of clarity, in the drawing the primary winding of the transformer 89 has been duplicated opposite the windings 136 and 139, but it is to be understood that the windings 88, 91, 136, and 139 may be on a common core for economy of apparatus. The cathodes of the triodes 121 through 124 are connected via a resistor 142 to a center tap on the secondary winding 136 and via a resistor 143 to a center tap on the secondary winding 139. The grids 131 and 132 are connected through a further secondary winding 144 of the transformer 67 while the grids 133 and 134 are connected through a still further secondary winding 146 of the transformer 67 to the cathodes of the tubes 121 through 124. The primary winding 66 of the transformer 67 is repeated in this portion of the figure in the same manner as the primary winding of the transformer 89 for the purpose of clarity in the drawing. The windings 136 and 139 of the transformer 89 are differentially coupled to the transformer 89 so that when the upper end of the winding 136 is positive, the lower end of the winding 139 is positive. Also, the windings 144 and 146 are differentially coupled to the primary winding 66 of the transformer 67 so that when the upper end of the winding 144 is positive, the lower end of winding 146 is negative. The center tap of the winding 136 is coupled via resistor 147 to the lead 31 while the center tap of the winding 139 is grounded. A filter capacitor 148 is connected between the lead 31 and ground.

For the purposes of illustrating the operation of the discriminator 28 it is assumed that initially the upper end of the transformer winding 136 is positive and that the upper end of the winding 144 is positive. At this time, the only tube of the group of four tubes 121 through 124 that is conducting is the tube 121 since it is the only one having positive potentials applied to both its grid and its anode. Upon conducting, the tube 121 develops a voltage across the resistor 142 which is filtered by the filter elements 147 and 148. Since the center tap of the winding 139 is grounded, the voltage appearing at the center tap of the winding 136 is negative with respect to ground. Upon a reversal of the phase of the voltages applied to the various transformer windings in the discriminator 28, the plate of the anode and grid of the tube 123 are rendered positive and a second cycle of conduction is established through the resistor 142 which is in the same direction as that established by the tube 121. Therefore, the voltage appearing at the center tap of the winding 136 is a rectified A.C. voltage, filtered by the elements 147 and 148 to develop a negative direct voltage on the lead 31. Upon reversal of the relative phases of the voltages appearing in the windings 136 and 139 on the one hand with respect to the windings 144 and 146 on the other hand, the tubes 122 and 124 are rendered conductive on alternate half cycles and a positive voltage is developed on the lead 31. Specifically, if it is assumed that the upper end of the winding 139 is positive when the upper end of the winding 144 is positive, then on the first half cycle the tube 122 is rendered conductive, and on the next half cycle the tube 124 is rendered conductive and the two half cycles establish a flow of current through the resistor 143. Since the center tap of the winding 139 is grounded, the cathodes of the tubes 121 through 124 are rendered positive with respect to ground and, in consequence, so is the center tap of the winding 136 of the transformer 67. Therefore, the voltage appearing on the lead 31 is positive with respect to ground. It is apparent then that the polarity of the voltage on the lead 31 is determined by the phase of the voltage across the primary winding 88 of the transformer 89 with respect to the phase of the voltage across the primary winding 66 of the input transformer 67. Since the voltage across this latter element is fixed, being determined by the voltage generated by the oscillator 21, the reversible phase characteristic of the output voltage appearing on the leads 27 of the adjustable gain amplifier 23 determines the polarity of the D.C. voltage on the lead 31. Further, since the magnitudes of the voltages induced in the windings 136 and 139 of transformer 89 are proportional to the signal applied to the leads 39, and since these voltages constitute the plate voltages of the tubes 121 through 124, and the grid voltages of these tubes are determined by the invariable input voltage to the adjustable gain amplifier 23, the degree of conduction of the tubes 121 through 124 is determined by the magnitude of the output voltage of the variable gain amplifier 23. Also, since the degree of conduction of tubes 121 through 124 determines the magnitude of the voltage on lead 31, the magnitude of the voltage appearing on the lead 31 is proportional to the magnitude of the output voltage appearing on the leads 39. If the voltage appearing on the lead 31 differs from the voltage appearing on the lead 13, then a voltage indicative of the difference between the voltages is developed on the grid 102 of the vacuum tube 98 in order to vary the relative degree of conduction of the tubes 72 and 84 to the extent necessary to correct the voltage on the lead 31 until it substantially equals the voltage on the lead 13. It is apparent then that the elements illustrated in FIGURE 3 accomplish their intended purpose of developing on the leads 39 a reversible phase, variable amplitude signal having a phase and amplitude determined by the polarity and amplitude of the direct current signal appearing on the lead 13.

Figure 3:
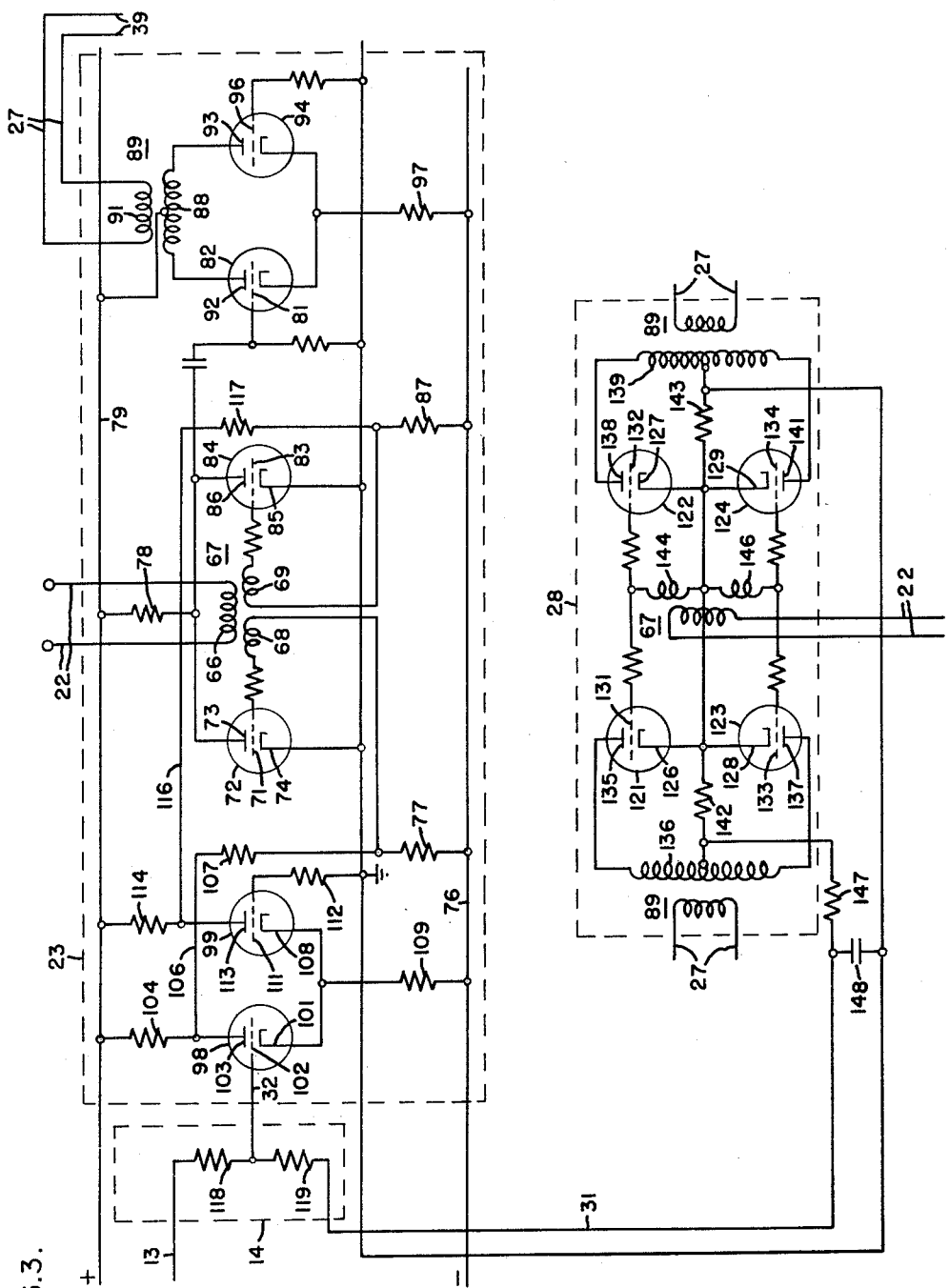
FIGURE 3 is a schematic wiring diagram illustrating three of the important elements of the invention and their interconnection.

The various tubes in the circuits illustrated in FIGURE 3 have been described as triodes, but it is obvious that other types of tubes may be employed. Further, in most instances, twin triodes are employed in preference to single triodes and, therefore, the tubes 98 and 99 may be included within a single envelope as may be the tubes 72 and 84, 82 and 94, 121 and 122 and 123 and 124. It is to be appreciated that the specific circuits illustrated in FIGURE 3 are not intended to limit the scope of the present invention although the circuits illustrated are preferred in practice of the invention.

While I have described and illustrated specific embodiments of my invention, it will be clear that variations of the details of construction which are specifically illustrated and described may be resorted to without departing from the true spirit and scope of the invention as defined in the appended claims.

What I claim as new and desire to secure by Letters Patent of the United States is:

1. A frequency conversion system for producing alternating signals having a first frequency and having at least their relative amplitudes, determined by the relative phases of two alternating signals of a second frequency in which one of the latter signals is a phase reference signal and the other of the latter signals is a variable phase information signal, said system comprising means for producing a pair of direct current signals having magnitudes and polarities proportional to the relative magnitudes and phase of quadrature components of said information signal with respect to said reference signal, and means for determining the amplitude of each of said pairs of alternating signals of said first frequency by the magnitude of a different one of said direct current signals.

2. A frequency conversion system for producing alternating signals having a first frequency and having at least their relative amplitudes determined by the relative phases of two alternating signals of a second frequency in which one of the latter signals is a phase reference signal and the other of the latter signals is a variable phase information signal, said system comprising means for producing a pair of direct current signals having magnitudes and polarities determined by the sine and cosine functions respectively of the angle between said signals of the second frequency and means for determining the amplitude of each one of said pairs of alternating signals of said first frequency by the magnitude of a different one of said direct current signals.

3. A system for producing a first signal having a first frequency and an instantaneous phase angle with respect to a first standard phase signal of said first frequency which conforms to the instantaneous phase angle of a second signal of a second frequency with respect to a second standard phase signal of said second frequency, said system comprising means for generating a pair of signals, one of which constitutes said first standard signal, said pair of signals of said first frequency having a phase angle therebetween and respective amplitudes which are equal to the phase angle between and the respective amplitudes of components of said second signal in a predetermined coordinate system having a component cophasal with said second standard signal and means for combining said pair of signals to produce said first signal.

4. A system for generating a first pair of signals of a first frequency having an instantaneous phase relative to one another equal to the instantaneous phase of a variable phase signal with respect to a fixed phase signal both of a second frequency, said system comprising means responsive to said signals of said second frequency for generating a second pair of signals each having an amplitude indicative of a different one of two components of said variable phase signal taken with respect to a predetermined coordinate system having one axis cophasal with said fixed phase signal, a source for generating a third pair of signals of said first frequency having a relative phase equal to the angle between the components of said predetermined coordinate system, means for producing a fourth pair of signals having the same phase relationship and frequency as said third pair of signals and each having an amplitude determined by the amplitude of a different one of said second pair of signals, and means for combining said fourth pair of signals to produce a variable phase signal constituting one of said first pair of signals, one of said signals of said third pair constituting the other signal of said first pair of signals.

5. A system for generating a first pair of signals of a frequency having an instantaneous relative phase equal to the instantaneous phase of a variable phase signal with respect to a fixed phase signal both of a second frequency and constant amplitude, said system comprising means for generating a pair of D.C. signals each having an amplitude indicative of different trigonometric functions of the angle between said fixed phase and said variable phase signals, means for generating a second pair of signals of said first frequency in phase quadrature, said first pair of signals each having an instantaneous amplitude determined by a different one of said D.C. signals, and means for combining said second pair of signals to produce one of said first pair of signals.

6. A program control system for controlling the position of a rotor in accordance with a pair of variable signals having a first frequency and having variable parameters determined by the relative phases of a reference phase signal and a variable phase signal of a second frequency, said system comprising means for generating said reference phase signal and said variable phase signal, means for generating a pair of direct current signals having magnitudes and phases determined by the components of said variable phase signals along the axis of a coordinate system having an axis cophasal with said reference phase signal, a source of signals of said first frequency, means for producing said pair of variable signals with each having a phase and an amplitude determined by the polarity and amplitude of a different one of said direct current signals, a resolver having first and second field windings and a rotor winding, a motor for producing rotation of said rotor winding, means for applying each of said pair of alternating current signals of said first frequency to a different one of said field windings and motor control means responsive to the voltage produced in said rotor winding for effecting rotation of said motor in a direction and to an extent necessary to produce a predetermined angle between said rotor and the resultant magnetic field produced by the signals applied to said field windings.

7. A program control system for controlling the position of a rotor in accordance with a pair of variable signals having a first frequency and having variable parameters determined by the relative phases of a reference phase signal and a variable phase signal of a second frequency, said system comprising means for generating said reference phase signal and said variable phase signal, means for generating a pair of direct current signals having the magnitudes and phases determined by the components of said variable phase signals along the axis of a coordinate system having an axis cophasal with said reference phase signal, a source of signal of said first frequency, means for producing said pair of alternating variable signals with each having a phase and an amplitude determined by the polarity and amplitude of a different one of said direct current signals, a resolver having first and second field windings and a rotor winding, a motor for producing rotation of said rotor winding, means for applying each of said pair of alternating current signals of said first frequency to a different one of said field windings and motor control means responsive to the voltage produced in said rotor winding for effecting rotation of said motor in a direction and to an extent necessary to cause a voltage of a predetermined magnitude to be induced in said rotor winding.

8. A program control system for controlling the position of a motor in accordance with a pair of variable signals having a relatively high frequency, and having their phases and magnitudes determined by the relative phases of a reference phase signal and a variable phase position control signal both of a relatively low frequency, said system comprising means for generating said reference phase and said variable phase signals, means for producing a pair of direct current signals each having a magnitude and polarity determined by the magnitude and phase of the sine and cosine functions respectively of the angle between said variable phase signal and said phase reference signal, a source of signals of said first frequency, means coupled to said source for producing said pair of variable signals each having a magnitude and sense determined by the magnitude and polarity of a different one of said direct current signals, a resolver having a rotor winding and two field windings disposed to produce quadraturely related magnetic fields, means for coupling each of said pair of signals to a different one of said field windings, a motor connected to produce rotation of said rotor winding, means for producing a motor control signal indicative of the phase of the voltage induced in said rotor winding and means for effecting rotation of said motor in a direction and to an extent necessary to reduce said control voltage to zero.

9. A program control system for controlling the position of a motor in accordance with a pair of variable signals having a relatively high frequency and having their phases and magnitudes determined by the relative phases of a reference phase signal and a variable phase position control signal both of a relatively low frequency, said system comprising means for generating said reference phase and said variable phase signals, means for producing a pair of direct current signals each having a magnitude and polarity determined by the magnitude and phase of the sine and cosine functions respectively of the angle between said variable phase signal and said phase reference signal, a source of two signals of said first frequency in phase quadrature, means coupled to said source for producing said pair of variable signals each having a magnitude and sense determined by the magnitude and polarity of a different one of said direct current signals, a resolver having a rotor winding and two field windings disposed to produce quadraturely related magnetic fields, means for coupling each of said pair of signals to a different one of said field windings, a motor connected to produce rotation of said rotor winding, means for producing an error voltage having a magnitude and polarity determined by the magnitude and sense of the difference in phase between the vector sum of said two signals of a first frequency and the voltage induced in said rotor winding and means to effect the rotation of said motor to reduce said error signal to zero.

10. A program control system for controlling the position of a motor in accordance with a pair of variable signals having a relatively high frequency and having their phases and magnitudes determined by the relative phases of a reference phase signal and a variable phase position control signal both of a relatively low frequency, said system comprising means for generating said reference phase and said variable phase signals, means for producing a pair of direct current signals each having a magnitude and polarity determined by the magnitude and phase of the sine and cosine functions respectively of the angle between said variable phase signal and said phase reference signal, a source of two signals of said first frequency in phase quadrature, means for producing said pair of variable signals, each having a magnitude and sense determined by the magnitude and polarity of a different one of said direct current signals, a resolver having a rotor winding and two field windings disposed to produce quadraturely related magnetic fields, means for applying each of said pair of voltages to a different one of said field windings, a motor connected to produce rotation of said rotor winding, means for producing an error voltage having a magnitude and polarity determined by the magnitude and sense of the difference in phase between the voltage induced in said rotor winding and a signal indicative of the desired phase of the voltage in said rotor winding and means to effect rotation of said motor to reduce said error signal to zero.

11. A program control system for controlling the position of a motor in accordance with a pair of variable signals having a relatively high frequency and having their phases and magnitudes determined by the relative phases of a reference phase signal and a variable phase position control signal both of a relatively low frequency, said system comprising means for generating said reference phase and said variable phase signals, means for producing a pair of direct current signals each having a magnitude and polarity determined by the magnitude and phase of the sine and cosine functions respectively of the angle between said variable phase signal and said phase reference signal, a source of signals of said first frequency, means for producing said pair of variable signals with each having a magnitude and a sense determined by the magnitude and polarity of a different one of said direct currents signals, a resolver having a rotor winding and two field windings for producing quadraturely related magnetic fields, means for applying each of said pair of signals to a different one of said field windings, a motor for producing rotation of said rotor winding and means for producing rotation of said motor to reduce the voltage in said rotor winding to zero.

12. A system for generating a first pair of high frequency alternating-current signals having an instantaneous relative phase with respect to each other which is equal to the instantaneous relative phase of a pair of low frequency alternating current signals, said system comprising means for generating a pair of direct-current signals having amplitudes determined by the in-phase and quadrature-phase components respectively of one of said low frequency signals with respect to the other of said low frequency signals, means for generating a second pair of high frequency signals of the same relative phase as said components of said one low frequency signal and of amplitudes determined by said pair of direct-current signals and means for combining said second pair of high frequency signals one with the other to produce one of said first pair of high frequency signals.

13. A system for converting information contained in the phase relationship of signal vectors of a first frequency into information contained in the relationship of a pair of signals of a second frequency comprising means for deriving a pair of signals proportional to the projection of one of said vectors on any Cartesian coordinate system, a source of signals of said second frequency, and means responsive to said derived pair of signals for controlling the relationship of said pair of signals of a second frequency.

14. A system for converting information contained in the phase relationship of signal vectors of a first frequency into information contained in the relationship of a pair of signals of a second frequency comprising means for deriving a pair of signals proportional to the projection of one of said vectors on any Cartesian coordinate system, a source of signals of said second frequency, means responsive to said derived pair of signals for controlling the relationship of said pair of signals of a second frequency, and means for adding said pair of signals of a second frequency to produce an output signal whose phase relationship with respect of one of said pair of signals of a second frequency changes by the same angular amount as any change in the phase relationship of the pair of signals of a first frequency.

15. A frequency conversion system comprising means for producing a pair of varying current signals having a first frequency, a source of varying current signals having a second frequency, and means responsive to the phase displacement of one signal of said second frequency to another signal of said second frequency to control the relative amplitude of said pair of signals of said first frequency.

16. A frequency conversion system comprising means for producing a pair of varying current signals having a first frequency, a source of varying current signals having a second frequency, and means responsive to the ratio of the sine and cosine of a phase angle between one signal of said second frequency and another signal of said second frequency to determine the relative amplitudes of said pair of signals of said first frequency.

17. A frequency conversion system comprising means for producing a pair of varying current signals having a first frequency, means for producing at least a pair of varying current signals having a second frequency, and means responsive to the phase displacement of one signal of said first frequency with respect to another signal of said first frequency to control the phase relationship of one of said signals of said first frequency with respect to the phase of the other signal of said first frequency.

18. A frequency conversion system comprising means for producing a pair of varying signals having a first frequency, means for producing at least a pair of varying current signals having a second frequency, and means responsive to the relative phase displacement of a pair of signals of said second frequency to maintain the relative phase displacement of said signals of said first frequency essentially equal to the relative phase displacement of said pair of signals of said second frequency.

References Cited in the file of this patent

UNITED STATES PATENTS

| | | |
|---|---|---|
| 2,537,770 | Livingston et al. | Jan. 9, 1951 |
| 2,775,712 | MacCallum et al. | Dec. 25, 1956 |
| 2,866,145 | Peaslee et al. | Dec. 23, 1958 |